Figure 1:
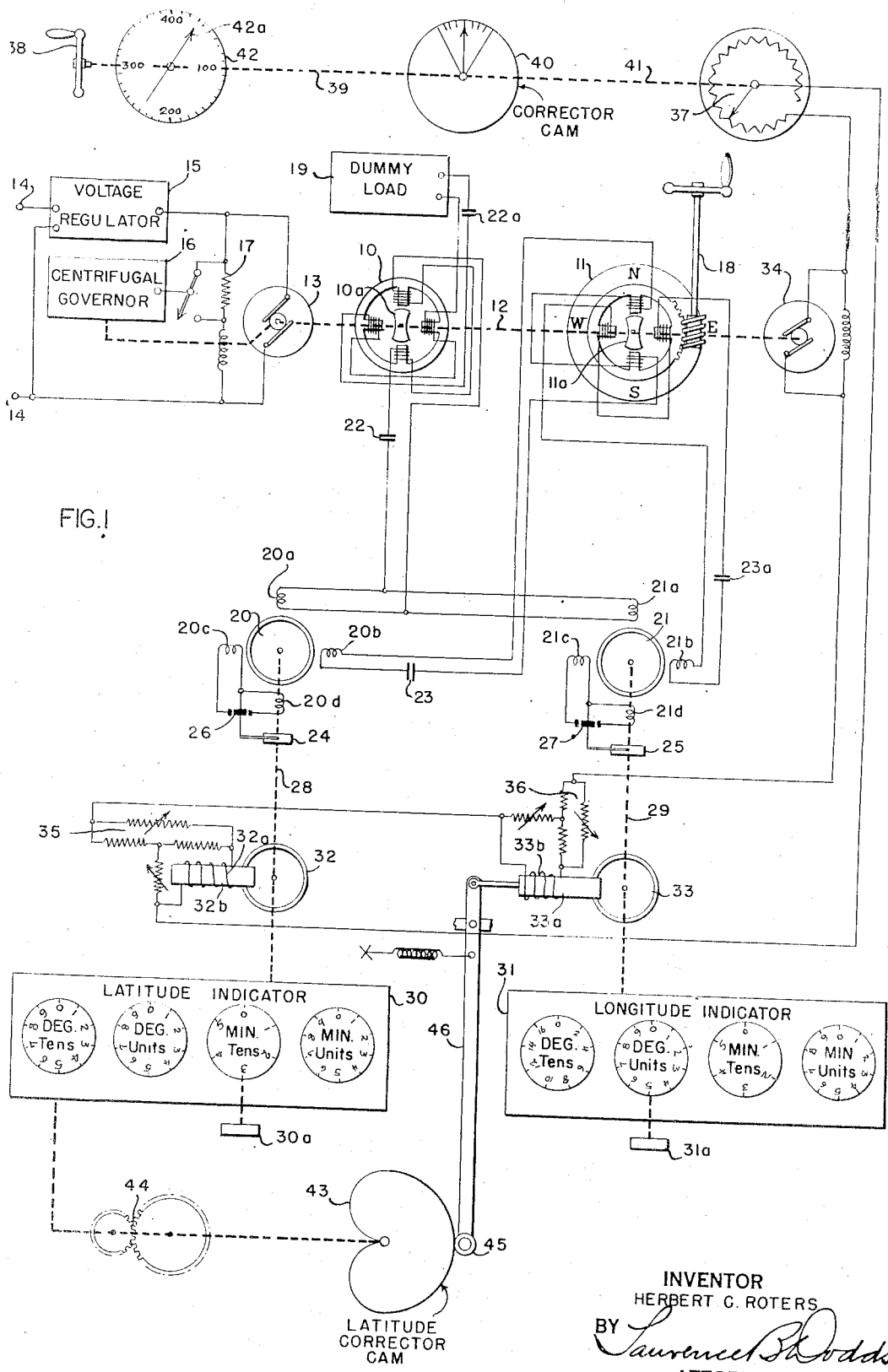

July 2, 1946.   H. C. ROTERS   2,403,152
ELECTRICAL POSITION INDICATING SYSTEM
Filed Nov. 2, 1942   3 Sheets-Sheet 2

INVENTOR
HERBERT C. ROTERS
BY
ATTORNEY

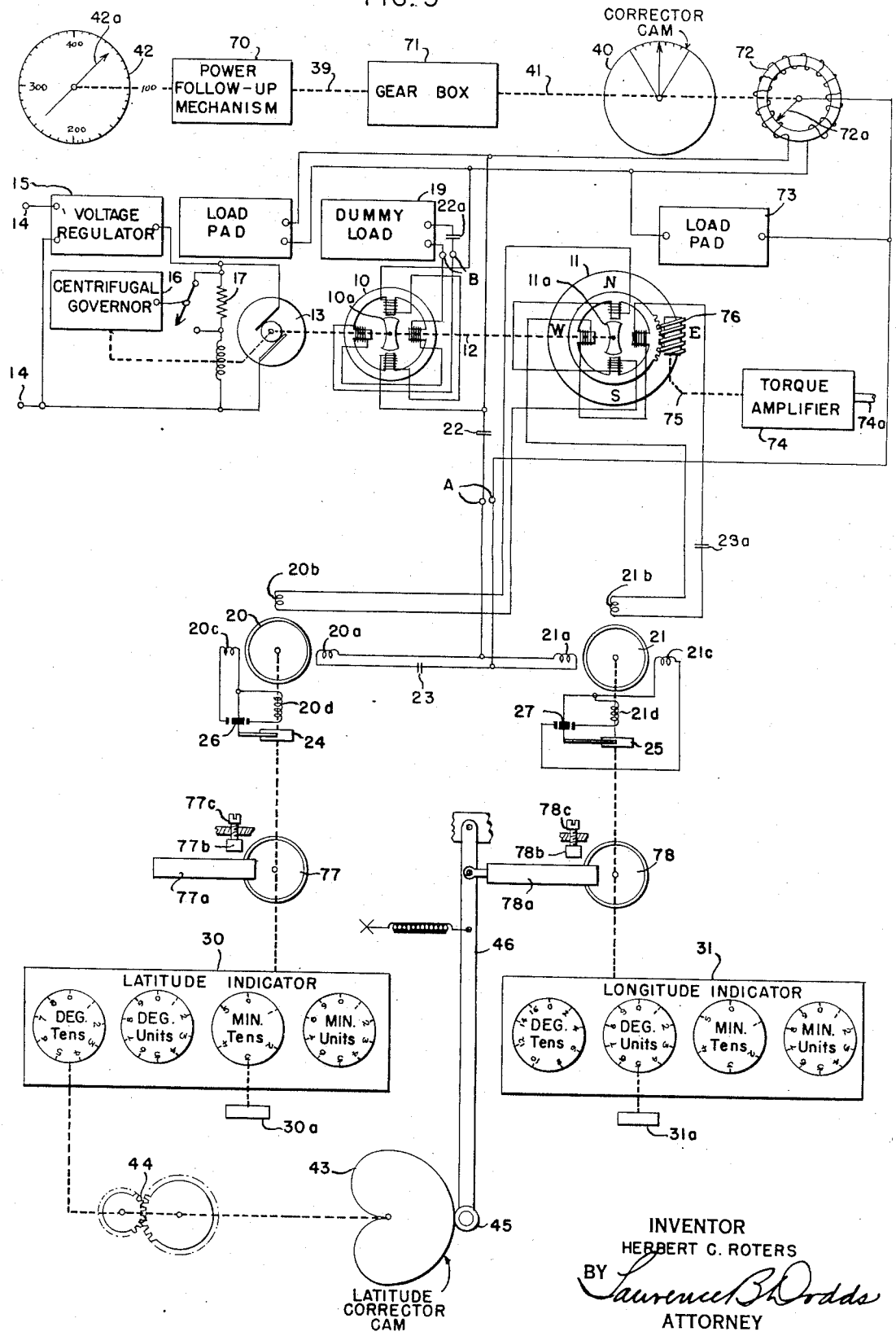

Patented July 2, 1946

2,403,152

UNITED STATES PATENT OFFICE 2,403,152

ELECTRICAL POSITION INDICATING SYSTEM

Herbert C. Roters, Roslyn, N. Y., assignor to Fairchild Camera and Instrument Corporation, a corporation of Delaware Application November 2, 1942, Serial No. 464,306

11 Claims. (Cl. 235—61)

This invention relates to an electrical system for indicating the course of a mobile vehicle and, while it is of general application, it is particularly suitable for use in indicating directly on dials the distances covered by a vehicle, such as an aircraft, in the north-south and east-west directions, either directly in miles or in degrees of latitude and longitude, respectively.

In the operation of mobile vehicles, it is often desirable to be able to obtain a continuous indication of the position of the vehicle. This is particularly true in the case of ships and aircraft which operate over great distances in which there are no objects from which bearings can be taken. It is particularly desirable to provide such a system which is rugged, stable, and easily adjusted, which gives direct readings of latitude and longitude, and which at the same time avoids errors frequently appearing in instruments of such a type which are frequently greatly affected in their operation by variable operating conditions, such as fluctuations in the power supply, variations in ambient and local temperatures, and the like.

It is an object of the present invention, therefore, to provide a new and improved electrical system for indicating the course of a mobile vehicle which realizes one or more of the above-named advantages and which gives a direct indication of the distance covered by the mobile vehicle either in miles or degrees of latitude and longitude.

It is another object of this invention to provide a system of the type described, in which the errors usually occurring in instruments of the type are largely self-compensating.

In accordance with the invention an electrical system for indicating the course of a mobile vehicle comprises means for generating a primary alternating current electrical signal and two secondary alternating current electrical signals, together with means for varying the phase of the primary and secondary signals relative to each other in accordance with the direction of the course of the vehicle. The system also includes a pair of integrating indicating means jointly energized by the primary signal and individually energized by the secondary signals and responsive to the relative phase thereof, and means for controlling the action of the integrating means in accordance with the velocity of the vehicle, whereby each of the integrating means indicates the position of the vehicle in one direction.

In a preferred embodiment of the invention, the means for generating the primary signal is a fixed-phase reference generator, the means for generating the two secondary signals comprises a variable-phase two-phase generator driven from a driving means common to the reference generator, and the means for varying the electrical characteristic of the secondary signal comprises means for shifting the phase of the output signal of the variable-phase generator. The preferred system includes a pair of two-phase eddy current motors each having a first winding excited from the reference generator and a second winding, the second windings being excited from different windings of the variable-phase generator, while north-south and east-west integrating indicating devices are individually driven by the motors. The control of the integrating devices in accordance with the velocity of the vehicle is effected either by variably loading the eddy current motors, as by eddy current brakes coupled thereto and excited by a voltage variable in accordance with the velocity of the vehicle. Alternatively, such control may be effected by means for varying the amplitude of one of the primary and secondary signals as applied to the eddy current motors in accordance with the velocity of the vehicle.

The control in accordance with the velocity of the vehicle may be introduced either manually or automatically by a power position repeater operated from an air-speed indicator. The variation in the electrical characteristic of the primary and secondary signals relative to each other also may be effected either manually or automatically by a power compass either directly or through a position repeating system.

For a better understanding of the present invention, together with other and further objects thereof, reference is had to the following description taken in connection with the accompanying drawings, and its scope will be pointed out in the appended claims.

Figure 2:
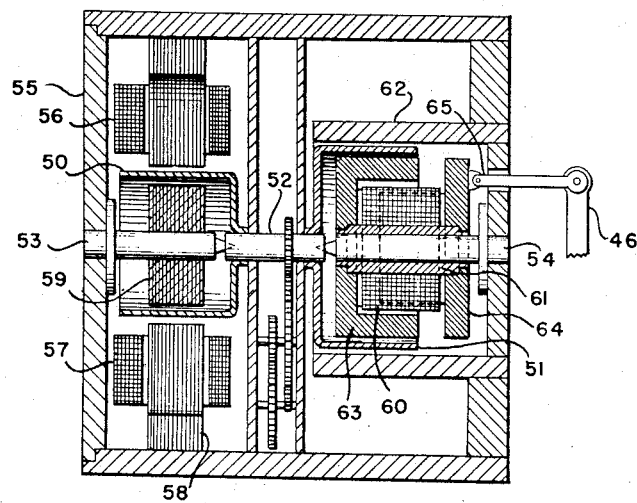
Figure 3A:
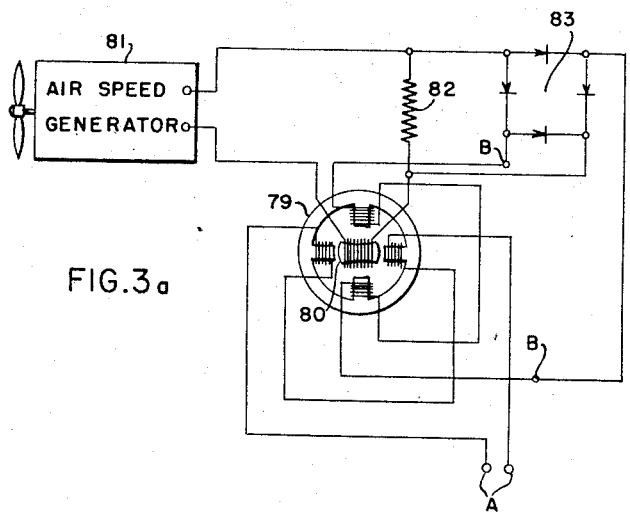

Referring to the drawings, Fig. 1 is a diagram, partially schematic, of a complete electrical system for indicating the course of a mobile vehicle; Fig. 2 is a cross-sectional view of a combined eddy current motor and brake suitable for use in the system of Fig. 1; Fig 3 is a circuit diagram, partially schematic, of a modified form of the system of Fig. 1 in which the control in accordance with the velocity of the vehicle is introduced into the excitation of the eddy current motor rather than the brake; while Fig. 3a is a circuit diagram of a modified form of the reference signal generator of Fig. 3.

Referring now to Fig. 1 of the drawings, the electrical indicating system there represented includes a two-phase alternating current generator 10 comprising means for generating a primary electrical signal and a two-phase alternating current generator 11 comprising means for generating two secondary electrical signals. The rotors of the two generators 10 and 11 are mounted on a common shaft 12 driven by a suitable constant speed source, such as a direct current motor 13 energized from direct current supply terminals 14 through a voltage regulator 15.

The motor 13 is provided with a centrifugal governor 16, or the equivalent, operating on a field resistor 17 of the motor 13 to regulate closely the speed of the motor 13 and generators 10 and 11.

The generator 10 may be referred to as a fixed-phase or reference generator, as the phase of its output voltage is constant, while the output signal of the generator 11, which is a variable-phase generator, can be manually adjusted by means of a suitable mechanism 18 for angularly rotating the stator of the generator, this mechanism 18 constituting means for varying an electrical characteristic, that is, the phase of the output signals of the generator 11 relative to that of the generator 10 in accordance with the direction of the course of the vehicle, the individual two-phase output signals being varied in accordance with the north-south and east-west components of the course of the vehicle. The generators 10, 11, the motor 13 and its associated apparatus, and the adjusting mechanism 18 may all be of conventional form. The generators 10 and 11 comprise permanent magnet rotors or field members 10a and 11a, respectively, and two-phase armature windings. Since they are operated at constant speeds, they generate signals of substantially constant amplitude.

The system also includes a pair of integrating indicating means comprising a pair of polyphase alternating current motors, preferably two-phase eddy current motors 20 and 21. The motors 20, 21 are individually energized by the two secondary signals, that is, from the two phases of generator 11, and are operable at speeds variable in accordance with the electrical characteristic, specifically the phase, thereof. Specifically, the motors 20, 21 have their respective phase windings 20a and 21a excited from one phase of the reference generator 10, and have respective second windings 20b and 21b excited from different phase windings of the variable-phase generator 11. Since only one phase of generator 10 is loaded, a dummy load 19 is preferably connected across the other phase to maintain the load symmetrical. The exciting circuits of the windings of the motors 20 and 21 are preferably tuned approximately to resonance by means of the series condensers 22, 22a and 23, 23a, respectively. The motors 20 and 21 are also provided with auxiliary means associated with each motor for overcoming the friction load thereon and including means responsive to the direction of rotation thereof for reversing the sense of action thereof. This auxiliary means comprises the pairs of reversely acting shaded coils 20c, 20d and 21c, 21d, respectively, the circuits of which are selectively closed by friction clutches 24 and 25, respectively, driven by the motors, and switches 26 and 27, respectively, which are responsive to the direction of rotation of the motors.

The motors 20 and 21 are provided with shafts 28 and 29, respectively, which are connected to operate integrating indicating devices such as the latitude and longitude indicators 30, 31, respectively, which may be of the conventional watt-hour clock or cyclometer type, for indicating the elapsed distances in the north-south and east-west directions in minutes and degrees. The indicators 30 and 31 are provided with suitable reset mechanisms 30a and 31a.

In order to modify the indications of the indicators 30 and 31 in accordance with the velocity of the vehicle, there is provided means for controlling the action of the integrating means comprising these indicators in accordance with the velocity of the vehicle. In the system of Fig. 1, this is accomplished by means for variably loading the motors to control the action of the motors in accordance with the velocity of the vehicle. To this end there are provided eddy current brakes 32 and 33 attached to the shafts 28 and 29 of the motors 20 and 21, respectively, these brakes being provided with exciting field magnets 32a and 33a, respectively, having windings 32b and 33b. This controlling means also includes means for developing a voltage variable in accordance with the velocity of the vehicle, for example, a direct current generator 34 mounted on the shaft 12 and driven by the motor 13, and an adjustable resistor 37. The generator 34, windings 32b, 33b, and resistor 37 are all connected in a single series circuit so that the windings 32b, 33b are excited by and responsive to such variable voltage. Connected across the exciting windings 32b and 33c are resistor-attenuator networks 35 and 36, respectively, including adjustable resistor elements so connected as to regulate the current through the windings 32b and 33b without materially modifying the resistance of the circuit as a whole. Connected in series with the generator 34 and the windings 32b and 33b is an adjustable resistor 37 adjustable by means of a manually operated crank 38 through a primary shaft 39, a linear corrector cam 40, and a secondary shaft 41. The corrector cam 40 is effective to establish a linear controlling action on the integrating indicating devices 30, 31. Mounted on the shaft 39 may be included also a pointer 42a of an indicator 42 for reproducing the setting of the speed indicator of the vehicle. The linear corrector cam 40 may be of any well-known conventional type which will reproduce an original angular motion with an angular correction within given limits for each position of the input shaft. One well-known form comprises a flexible helical spring wound on a series of screw-adjusted dogs supporting it at spaced intervals, together with a follower roller operating on the periphery of the helical spring and driving the output shaft through a crank arm and a step-up-ratio gearing.

In order to compensate the indication of the longitude indicator 31 in accordance with the latitude of the vehicle, there is provided a means responsive to the north-south integrating means for compensating the east-west integrating means in accordance with the latitude of the vehicle. This may comprise a latitude-corrector cam 43 actuated by the north-south or latitude indicator 30 by a 2:1 step-up gearing 44 and a follower roller 45 mounted on a pivoted link 46 which is effective to adjust the radial position of the field magnet 33a of the eddy current brake 33.

A cross-sectional view of a combined eddy current motor and eddy current brake suitable for use in the system of Fig. 1 is illustrated in Fig. 2 of the drawings. This device comprises a cup-shaped eddy current motor rotor 50 and a cup-shaped eddy current brake rotor 51 mounted on a common shaft 52 pivoted at opposite ends on the stud pins 53 and 54 supported in the opposite ends of the casing 55. The eddy current motor comprising the rotor 50 includes also two-phase exciting windings, one phase of which comprises the coils 56 and 57 mounted on a laminated core structure 58 supported within the casing 55 and including an annular laminated core portion 59 supported on the stud pin 53 and forming with the core 58 a narrow annular air gap in which the rotor 50 rotates. Co-operating with the brake rotor 51 is an exciting winding 60 mounted on an insulating bushing 61 supported on the stud pin 54. Surrounding the brake rotor 51 is an annular magnetic yoke 62. Mounted within the rotor 51 is a magnetic armature for the winding 60 comprising a cup-shaped magnetic core 63 having wide slots cut in opposite sides thereof so as to form two axially projecting poles and a similarly formed cup-shaped core member 64 having two projecting poles interleaving the poles of the member 63. The core members 63 and 64 are mounted on an inner core in the form of a sleeve 61 axially adjustable along the stud pin 54 by means of a pin and link mechanism 65, adjustment of the core members 63, 64 relative to rotor 51 effectively adjusting the flux linkage between the core members and the rotor 51 while maintaining the magnetic field, and thus the exciting current, substantially constant.

Coming now to the operation of the system represented in Fig. 1, the generators 10 and 11 are driven at substantially constant speed by the motor 13 so that both the primary or reference alternating current signal and the secondary alternating current signals are maintained at substantially constant frequency and amplitude. The phase of the signal output of the generator 10 is maintained constant, while that of the output signal of the variable-phase generator 11 is manually adjusted in accordance with the direction of the course of the vehicle by the mechanism 18.

One phase of each of the motors 20, 21 is excited from one phase of the generator 10; the other phase windings of the motors 20, 21 are excited from different phase windings of the generator 11. It is a characteristic of this type of eddy current motor that the torque developed is proportional to the product of the currents in the two-phase windings and the sine of the phase angle between these two currents. The principle of operation is exactly that of the integrating watt meters used for the commercial measurement of alternating current energy. Therefore, generator 11 is initially adjusted so that, with the vehicle heading true north, the output signals of the phase windings of this generator are in phase and in phase quadrature, respectively, with the output signal of the generator 10 applied to the windings 20a, 21a of the motors 20, 21, respectively. Then, for any given course of the vehicle, the phase angle between the current supplied from generator 11 to one of the motors, for example, the motor 20 associated with the latitude indicator, and that supplied by generator 10 will be 90 degrees minus the course angle and the torque developed by the latitude-indicator motor will be proportional to the sine of 90 degrees minus the course angle, which is the north-south or latitude component. Similarly, the torque developed by the longitude-indicator motor 21 will be proportional to the sine of the course angle, which is the east-west or longitudinal component of the vehicle motion.

In order to translate these torques into latitude and longitude readings, it is necessary to integrate them as functions of time. This is done by causing the motors 20, 21 to rotate at speeds proportional to their respective driving torques and counting their total revolutions. Such rotation proportional to torque is effected by means of the eddy current brakes 32, 33 which produce retarding or damping torques exactly proportional to speed and so give the desired result, provided that the speeds of the motors are low compared to their synchronous speed and provided that there is no appreciable friction load. The counting is done by the integrating devices 30 and 31 and, by utilizing appropriate gear ratios in these counters, they may be made to indicate directly in miles the distance covered, that is, the position of the vehicle relative to the starting point.

In a preferred embodiment, it is desired to indicate the position of the vehicle in minutes and degrees of latitude and longitude. Since the parallels of longitude are more clearly spaced for higher latitudes, the longitude indicator 31 is compensated by means of the latitude-corrector cam 43 which adjusts the exciting magnet 33a of the brake 33 to vary its effect on the eddy current brake. In case the combined eddy current motor and brake of Fig. 2 is utilized in the system, the adjusting link 65 is operated by the latitude-corrector cam. The shape of this cam is determined experimentally from a calibration of the speed of the motor 21 as a function of the radial position of the magnet 33a, which is usually a nonlinear function. The term "position of the vehicle," as used in the specification and appended claims, is, therefore, intended to describe the indication of the integrating devices either with the latitude corrector cam, in which case relative position is indicated, or without the corrector cam, in which case absolute position is indicated.

In order to control the action of the integrating indicating means in accordance with the velocity of the vehicle, there are provided means for developing a voltage variable in accordance with such velocity comprising units 34—42, inclusive. The retarding torque of the eddy current brake of the type of the units 32, 32 is proportional to the square of the exciting current. Hence, for the torque to be varied linearly with the velocity of the vehicle, the exciting current should vary inversely proportionally to the square-root of the vehicle velocity. This relationship is approximated by the variable series resistor 37, which results in a velocity-excitation current characteristic which is substantially hyperbolic. Any residual departure from the desired inverse-square-root relation is corrected by the linearity-correcting cam 40.

To calibrate the system with respect to the velocity of the vehicle, the generator 11 is adjusted to a position corresponding to due north by means of crank 18, the velocity indicator 42a is set to a given speed, preferably the cruising speed of the vehicle, and the resistor 37 is adjusted to its corresponding position while the corrector cam 40 is set to its mid-range position corresponding to zero correction. The resistor-attenuator network 35 associated with the eddy current brake 32 is then so adjusted as to give the proper speed as determined by the indicator 30 and a stop watch. Similarly, with the generator adjusted to a position corresponding to a due east course, the resistor-attenuator network 36 is so adjusted as to give the proper speed as determined by the indicator 31 and a stop watch. The attenuators 35 and 36 are now locked in this position and subsequent calibrations for different settings of the velocity indicator 42a are carried out by adjusting the corrector cam 40 to give the corresponding brake speeds for due north and east courses.

As was stated above, the desired relationship between the torques of the motors 20, 21, and their speeds, as determined by the eddy current brakes 32, 33, is obtained only with a negligible friction load. Such friction load is avoided by the use of the shading coils 20c, 20d and 21c, 21d associated with the motors 20, 21, respectively. The circuits of the two coils of each motor are selectively closed by the associated one of the switches 26, 27 and act reversely on their associated eddy current rotors, each being effective to overcome the friction load of the motor in a given direction of rotation. The friction clutches 24 and 25 associated with the motors 20, 21 are effective to select the shading coil in each case to overcome the friction load in the particular direction of rotation which, of course, changes with the change in the direction of the course of the vehicle on either side of the east-west and north-south directions.

The foregoing system has a number of advantages. It automatically compensates, to a large degree, for changes in speed of the driving motor 13 due to residual fluctuations in the power supply not eliminated by the voltage regulator 15 and governor 16. These residual speed changes are, moreover, minimized by the fact that the loads on generators 10 and 11 are constant. The voltages of the generators 10 and 11 vary directly with speed. These voltages are applied to the eddy current motors 20, 21, the torques of which vary with the square of the applied voltage but are independent of the corresponding frequency change provided that their circuits are substantially resistive. This is procured in this case by broadly tuning the motor circuits by means of the condensers 22, 23 and 22a, 23a so that they have a substantially constant and resistive impedance over the range of frequencies encountered in normal operation. On the other hand, the voltage developed by the generator 34, which excites the magnets 32a, 32b of the eddy current brakes 32, 33, respectively, also varies directly with the speed of the driving motor 13, while the drags of the brakes 32, 33 vary as the square of the excitation. Thus the torques of the motors 20, 21 and the drags of the brakes 32, 33 vary proportionately with variations in the speed of the driving motor 13 and are self-compensating.

The system is also self-compensating for changes in ambient temperature. Thus the resistances of the motors and generators, which are primarily copper circuits, vary directly with temperature and the currents in these circuits vary inversely with resistance and thus inversely with temperature. If the entire brake circuit, including the adjustable resistor 37, is also a copper circuit, its resistance varies in a similar manner and compensates the variation of the resistance of the motor generator circuits. In the case of local heating of particular elements, such as the adjustable resistor 37 and the exciting windings 32b and 33b of the eddy current brakes, any nonlinearity due to the change in resistance in these circuits is compensated by the linearity-correcting cam 40.

The dummy load 19 is effective to balance the load on the generator 10 so that the loads on both generators 10 and 11 are symmetrical and constant, thus preventing any change in the alternating current output or phase angle of these generators due to a variable load. In addition, since the loads on the generators 10 and 11 are constant, they can be designed for minimum size with heating rather than voltage regulation as a limitation on design. The use of the variable excitation of the eddy current brakes 32, 33 to introduce the velocity component of the vehicle into the system permits an easy initial adjustment of the system at its normal operating speed by varying the attenuator networks 35, 36 shunting the exciting coils 32b and 33b, respectively. These attenuator networks are so designed that their adjustments are independent of each other and do not affect the resistance of the circuit as a whole or the current in the remainder of the circuit so that they can be adjusted independently of each other.

There are certain adjustments of this system which contribute to the maximum accuracy under various operating conditions. The tuning of the several phase windings of the generators 10 and 11 to the operating range of frequencies by the condensers 22, 22a, 23, 23a to impart a substantially constant and resistive impedance to the generator circuits also results in a close voltage regulation of these generators. In order to prevent any appreciable reaction from the stator windings on the permanent magnet rotors of the generators 10 and 11, these rotors are preferably made of high retentivity alloy steel, such as that commercially available under the trade name "Alnico," and the generators are made with a relatively large air gap and very strong rotor magnets.

The system of Fig. 3 is similar to that of Fig. 1 except that the velocity of the vehicle and the direction of its course are introduced automatically, rather than manually, and that the velocity of the vehicle controls the system by variation of the excitation of the eddy current motors 20 and 21 by variation of the amplitude of the output of the reference generator 10, rather than by variation of the excitation of the eddy current brakes. Otherwise the system of Fig. 3 is similar to that of Fig. 1 and corresponding elements are identified by the same reference characters. This system includes means responsive to the velocity of the vehicle for varying the amplitude of the signal output of generator 10 as applied to the integrating indicating means. This means comprises the velocity indicator 42 having a pointer 42a coupled to a power follow-up mechanism which, through a suitable gear box 71, actuates the linearity-correcting cam 40. The output shaft 41 of the cam 40 operates an adjustable arm 72a of an autotransformer 72 excited across one phase of the reference generator 10. The secondary or output signal from the adjustable autotransformer 72 is applied to the phase windings 20a, 21a of the motors 20, 21, respectively. A load pad 73 is connected across the secondary portion of the autotransformer 72 to minimize variations in load on the generator 10.

In the system of Fig. 3, the adjustment of the stator of the generator 11 is effected by means responsive to the direction of the course of the vehicle for varying the phase of the secondary signals relative to the primary signals and comprising a power compass having a shaft 74a operating a torque amplifier 74 which, through a shaft 75, operates the gearing 76 associated with the stator of the generator 11. In the system of Fig. 3, the eddy current brakes 32, 33 of Fig. 1 are replaced by brakes 77, 78 having associated permanent damping magnets 77a, 78a, respectively. In order initially to calibrate the operation of the system, the magnets 77a, 78a are provided with magnetic shunts 77b, 78b, respectively, adjustable by screws 77c, 78c, respectively.

In general, the operation of the system of Fig. 3 is similar to that of Fig. 1 except that the signal output from one phase of the reference generator 10 is applied to the phase windings 20a, 21a of the motors 20, 21 and is varied in amplitude in accordance with the velocity of the vehicle by means of the adjustable autotransformer 72. As a result, the driving torques of the motors 20, 21 vary with the velocity of the vehicle, while the damping torques exerted by the brakes 77, 78 remain substantially constant, so that the speed of the indicating system varies directly with the velocity of the vehicle and the integrated distance covered is indicated by means of the indicators 30, 31 as in the system of Fig. 1.

In order to attain maximum accuracy in the system of Fig. 3, it is desirable that the voltage of the outputs and the phase angle between the two-phase currents of the generators 10 and 11 vary only in response to variations in the velocity and course of the vehicle and not in response to variations in the loads on these generators. Therefore, since the load on the generator 10 is variable, there is provided the load pad 73 which tends to maintain the load on the generator more constant. At the same time, the impedances of the generators 10 and 11 are preferably made low compared to those of their connected circuits. The adjustable magnetic shunts 77b and 78b provide means for readily adjusting the initial calibration of the system as well as for correcting for variations in the magnetic field of the permanent magnets 77a, 78a with age.

In Fig. 3a there is represented a modification of the arrangement of Fig. 3 for introducing the velocity factor into the system. In this case, the elements 42, 70, 71, 40, 41, and 72 are eliminated and the output of the reference generator 79 is varied in accordance with the velocity of the vehicle by providing it with a field winding 80 which is excited from an air-speed generator 81 through a resistor 82. The air-speed generator 81 is driven in a conventional manner such that its speed is proportional to the true air speed, for example, by a propeller as shown. If the generator 81 is provided with a constant field, for example, a permanent magnet field, its output voltage is proportional to true air speed. In order to compensate for variations in the resistance of the windings of the air-speed generator and of the generator 79 with variations in temperature, a voltage derived from one phase winding of the generator 79 is rectified by the rectifier 83, shown schematically as of the copper oxide type, and fed back across resistor 82 in the field circuit of the generator. The generator 79 of Fig. 3a and its associated circuit elements may be substituted for the generator 10 of Fig. 3 by connecting the terminals A, B of Fig. 3a to the corresponding terminals of Fig. 3. The operation is otherwise similar to that of Fig. 3.

This system has the advantage that the impedance of the circuits of generator 79 remains constant and independent of the velocity and, hence, there is no possible phase shift between the outputs of generators 79 and 11 as the velocity changes. This permits both generators 79 and 11 to be designed with heating as a limitation. If the circuits of these generators are made inductive, their current outputs are relatively independent of small changes in voltage produced by changes in the speed of the driving motor, because the reactance of the generator circuit decreases directly with the motor speed in the same proportion as the voltage decreases. In this manner, compensation for residual changes in generator speed is obtained.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical system for indicating the course of a mobile vehicle comprising, means for generating a primary alternating current electrical signal and two secondary alternating current electrical signals, means for varying the phase of said primary and secondary signals relative to each other in accordance with the direction of the course of said vehicle, a pair of integrating indicating means jointly energized by said primary signal and individually energized by said secondary signals and responsive to the relative phase thereof, and means for controlling the action of said integrating means in accordance with the velocity of said vehicle, whereby each of said integrating means indicates the position of said vehicle in one direction.

2. An electrical system for indicating the course of a mobile vehicle comprising, a pair of alternating current signal generators, a common driving means for said generators, one of said generators having a two-phase output winding, means for shifting the phase of the output signal of one of said generators relative to that of the other in accordance with the direction of the course of said vehicle, a pair of integrating indicating means individually energized from the phase windings of said one generator and by the other of said generators and responsive to the relative phase of output signals thereof, and means for controlling the action of said integrating means in accordance with the velocity of said vehicle, whereby each of said integrating means indicates the position of said vehicle in one direction.

3. An electrical system for indicating the course of a mobile vehicle comprising, a fixed-phase reference generator, a variable-phase two-phase generator, a common driving means for said generators, means for shifting the phase of the output signal of said variable-phase generator in accordance with the direction of the course of said vehicle, a pair of two-phase eddy current motors each having a first winding excited from said reference generator and a second winding, said second windings being excited from different windings of said variable-phase generator, north-south and east-west integrating indicating devices individually driven by said motors, and means for controlling the action of said motors in accordance with the velocity of said vehicle, whereby said integrating devices indicate positions of said vehicle in the north-south and east-west directions, respectively.

4. An electrical system for indicating the course of a mobile vehicle comprising, means for generating a primary electrical signal and two secondary electrical signals, means for varying an electrical characteristic of said primary and secondary signals relative to each other in accordance with the direction of the course of said vehicle, a pair of motors individually energized by said secondary signals and operable at speeds variable in accordance with variations in said electrical characteristic thereof, north-south and east-west integrating indicating devices individually driven by said motors, and means for variably loading said motors in accordance with the velocity of said vehicle, whereby said integrating devices indicate positions of said vehicle in the north-south and east-west directions, respectively.

5. An electrical system for indicating the course of a mobile vehicle comprising, means for generating a primary electrical signal and two secondary electrical signals, means for varying an electrical characteristic of said primary and secondary signals relative to each other in accordance with the direction of the course of said vehicle, a pair of motors individually energized by said secondary signals and operable at speeds variable in accordance with variations in said electrical characteristic thereof, north-south and east-west integrating indicating devices individually driven by said motors, means for developing a voltage variable in accordance with the velocity of said vehicle, and means responsive to said voltage for variably loading said motors, whereby said integrating devices indicate positions of said vehicle in the north-south and east-west directions, respectively.

6. An electrical system for indicating the course of a mobile vehicle comprising, means for generating a primary electrical signal and two secondary electrical signals, means for varying an electrical characteristic of said primary and secondary signals relative to each other in accordance with the direction of the course of said vehicle, a pair of motors individually energized by said secondary signals and operable at speeds variable in accordance with variations in said electrical characteristic thereof, north-south and east-west integrating indicating devices individually driven by said motors, means for developing a voltage variable in accordance with the velocity of said vehicle, and an eddy current brake coupled to each of said motors and excited by said voltage, whereby said integrating devices indicate positions of said vehicle in the north-south and east-west directions, respectively.

7. An electrical system for indicating the course of a mobile vehicle comprising, means for generating a primary electrical signal and two secondary electrical signals, means for varying an electrical characteristic of said primary and secondary signals relative to each other in accordance with the direction of the course of said vehicle, a pair of motors individually energized by said secondary signals and operable at speeds variable in accordance with variations in said electrical characteristic thereof, auxiliary means associated with each of said motors for overcoming the friction load thereof and including means responsive to the direction of rotation thereof for reversing the sense of action thereof, north-south and east-west integrating indicating devices individually driven by said motors, and means for variably loading said motors in accordance with the velocity of said vehicle, whereby said integrating devices indicate positions of said vehicle in the north-south and east-west directions, respectively.

8. An electrical system for indicating the course of a mobile vehicle comprising, a fixed-phase reference generator, a variable-phase two-phase generator, a common driving means for said generators, means for shifting the phase of the output signal of said variable-phase generator in accordance with the direction of the course of said vehicle, a pair of two-phase eddy current motors each having an eddy current rotor, a first winding excited from said reference generator and a second winding, said second windings being excited from different windings of said variable-phase generator, a pair of reversely-acting shading coils associated with each of said rotors for overcoming the friction load thereof, and means responsive to the direction of rotation of each of said motors for selectively energizing its associated shading coils, north-south and east-west integrating indicating devices individually driven by said motors, and means for controlling the action of said motors in accordance with the velocity of said vehicle, whereby said integrating devices indicate positions of said vehicle in the north-south and east-west directions, respectively.

9. An electrical system for indicating the course of a mobile vehicle comprising, means for generating a primary electrical signal and two secondary alternating current electrical signals of substantially constant amplitude, means for varying the phase of said primary and secondary signals relative to each other in accordance with the direction of the course of said vehicle, a pair of integrating indicating means jointly energized by said primary signal and individually energized by said secondary signals and responsive to the relative phase thereof, and means for varying the amplitude of one of said primary and secondary signals as applied to said integrating means in accordance with the velocity of said vehicle, whereby each of said integrating means indicates the position of said vehicle in one direction.

10. An electrical system for indicating the course of a mobile vehicle comprising, means for generating a primary electrical signal and two secondary electrical signals, means for varying a first electrical characteristic of said primary and secondary signals relative to each other in accordance with the direction of the course of said vehicle, means for varying the second electrical characteristic of at least one of said primary and secondary signals relative to the other in accordance with the velocity of said vehicle, a pair of integrating indicating means jointly energized by said primary signal and individually energized by said secondary signals and responsive to both of said electrical characteristics thereof, whereby each of said integrating means indicates the position of said vehicle in one direction.

11. An electrical system for indicating the course of a mobile vehicle comprising, means for generating a primary alternating current electrical signal and two secondary alternating current electrical signals, means for varying the phase of said primary and secondary signals relative to each other in accordance with the direction of the course of said vehicle, means for varying the amplitude of at least one of said primary and secondary signals relative to the other in accordance with the velocity of said vehicle, a pair of integrating indicating means jointly energized by said primary signal and individually energized by said secondary signals and responsive to the relative phase and amplitude thereof, whereby each of said integrating means indicates the position of said vehicle in one direction.

HERBERT C. ROTERS.